United States Patent
Hazlebeck

(12) 
(10) Patent No.: US 6,576,185 B2
(45) Date of Patent: Jun. 10, 2003

(54) SYSTEM AND METHOD FOR HYDROTHERMAL REACTIONS-THREE LAYER LINER

(75) Inventor: David A. Hazlebeck, El Cajon, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 09/753,320

(22) Filed: Dec. 28, 2000

(65) Prior Publication Data

US 2002/0084559 A1 Jul. 4, 2002

(51) Int. Cl.⁷ .............................................. B01D 35/00
(52) U.S. Cl. ......................................... 266/286; 210/90
(58) Field of Search ................................ 266/280, 286; 210/90

(56) References Cited

U.S. PATENT DOCUMENTS

| | | |
|---|---|---|
| 2,886,418 A | 5/1959 | Altimier |
| 3,472,632 A * | 10/1969 | Hervert et al. ................ 210/90 |
| 4,292,953 A | 10/1981 | Dickinson |
| 4,338,199 A | 7/1982 | Modell |
| 4,543,190 A | 9/1985 | Modell |
| 4,822,497 A | 4/1989 | Hong |
| 5,114,623 A | 5/1992 | Hutson |
| 5,120,448 A | 6/1992 | Dorica |
| 5,393,428 A | 2/1995 | Dilla |
| 5,492,634 A | 2/1996 | Hong |
| 5,527,471 A | 6/1996 | Hong |
| 5,552,039 A * | 9/1996 | McBrayer, Jr. et al. ....... 210/90 |
| 5,591,415 A | 1/1997 | Dassel |
| 5,674,405 A | 10/1997 | Bourhis |
| 6,054,057 A | 4/2000 | Hazlebeck |

* cited by examiner

Primary Examiner—Scott Kastler
(74) Attorney, Agent, or Firm—Nydegger & Associates

(57) ABSTRACT

A system and method for performing hydrothermal treatment includes reactor vessel formed with a pressure bearing wall surrounding a reactor chamber. A liner protects the wall from exposure to temperature extremes, corrosives and salt deposits. The liner is formed with three layers: a non-porous, corrosion resistant primary layer; a porous layer; and a non-porous, secondary layer. The porous layer is sealed between the primary layer and the secondary layer. The liner is positioned in the reactor chamber with the secondary layer facing the pressure bearing wall of the reactor chamber and the primary layer facing the reactor chamber. Connectors extend through the wall of the reactor vessel and the secondary layer to allow a fluid to be pumped through the porous layer to maintain the temperature of the liner. The connectors also allow for sampling of the fluid within the porous layer to detect leaks in the primary layer.

11 Claims, 4 Drawing Sheets

SYSTEM AND METHOD FOR HYDROTHERMAL REACTIONS-THREE LAYER LINER

FIELD OF THE INVENTION

The present invention pertains generally to methods and systems for the hydrothermal treatment of a feed stream to destruct waste, recovery heat, or produce beneficial chemicals. More specifically, the present invention pertains to methods and systems for the hydrothermal treatment of organics which contain inorganic compounds such as salts or oxides or which will generate these inorganic compounds. The present invention is particularly, but not exclusively, useful as a method and system for the hydrothermal treatment of organics under supercritical temperature and pressure conditions, or at supercritical temperatures and elevated, yet subcritical pressures.

BACKGROUND OF THE INVENTION

It is well known that a broad spectrum of materials can be chemically treated in an aqueous media at either supercritical temperature and pressure conditions, or at supercritical temperatures and elevated, yet subcritical pressures. In supercritical water oxidation ("SCWO"), the oxidation reaction occurs substantially entirely at conditions which are supercritical in both temperature (>374° C.) and pressure (>about 3,200 psi or 220 bar). Specifically, at temperatures of about five hundred degrees Celsius to six hundred fifty degrees Celsius (500° C.–650° C.) and pressures of about 250 bar, rapid and complete oxidation of virtually any organic compound can be obtained in an aqueous media in a matter of seconds. A process related to SCWO known as supercritical temperature water oxidation ("STWO") can provide similar oxidation effectiveness for certain feedstocks but at pressures as low as 25 bar. In both of these processes, the temperature and pressure can be varied to accommodate the type of feedstream and the desired result. For example, these processes can be used to combust materials of high thermal value for energy recovery; to convert hazardous waste materials into more benign materials; or to produce beneficial chemicals for later use. In general, these processes involve combining water, a reactant, and an oxidizer such as air or oxygen, at elevated temperatures and pressures. The resultant chemical reaction is generally exothermic and occurs directly within the aqueous phase. The energy released by the reaction can often be used to maintain the high temperatures and pressures required in the reactor vessel. By continuously feeding the reactants while withdrawing the reaction products, the energy released from the reaction can be used to heat the incoming feedstream. Batch type processing is generally inefficient in these processes due to the large amount of energy that would be needed to heat and pressurize each batch.

The various processes for oxidation in an aqueous media at temperatures above about three hundred seventy-four degrees Celsius and pressures above about 25 bar are referred to collectively as hydrothermal treatment. In addition to the increased reaction rates as described above, other reaction features distinguish hydrothermal treatment from reactions conducted at standard temperatures and pressures (STP), which are generally considered to be 25 degrees Celsius and 1.013 bar. For example, most inorganic salts have high solubility's in water at STP. In stark contrast, under hydrothermal treatment conditions, most inorganic salts are insoluble in the aqueous media. Consequently, inorganic salts that are present in the feedstreams precipitate from the aqueous media and create solids. These solids can be problematic because they often buildup on the surfaces of process equipment such as the walls of the pressure vessel used to contain the reaction. In continuous feed processes, the buildup of solids often progresses until the reactor vessel becomes plugged. Once the reactor vessel is plugged, the continuous reaction must be interrupted to clean out the reactor vessel, wasting valuable time and energy.

Further complicating hydrothermal treatment is the fact that corrosion rates generally increase with increasing temperature. Feedstreams used for hydrothermal treatment often generate corrosive acids such as hydrochloric acid and sulfuric acid, resulting in corrosive attack on the process vessel that is so severe that alkali is often added to neutralize the acids. Unfortunately, this addition of alkali creates insoluble salts which aggravate the vessel plugging problem described above. Further, stress considerations often dictate that the reactor vessel have a relatively narrow diameter and long length to thereby withstand the high pressures and corrosion rates generating in the reactor, yet reactor vessel's with narrow diameters further aggravate the plugging problem.

The extreme temperatures, pressures, corrosives and insoluble salts present in the hydrothermal reactor vessel present what can only be characterized as a harsh environment to the pressure bearing wall of the reactor vessel. To alleviate the effects of this environment on the pressure bearing wall, liners have been heretofore suggested to separate the reactor chamber from the pressure bearing wall. For example, U.S. Pat. No. 5,591,415 which issued to Dassel et al. entitled "Reactor for Supercritical Water Oxidation of Waste" discloses a reactor enclosed in a pressure vessel in a manner that the walls of the pressure vessel are thermally insulated and chemically isolated from the harsh environment of the reaction zone. Unfortunately, the liner disclosed by Dassel et al. fails to adequately address the problem associated with insoluble salt buildup and reactor plugging. Similarly, U.S. Pat. No. 3,472,632 which issued on Oct. 14, 1969 to Hervert et al. entitled "Internally Lined Reactor for High Temperatures and Pressures and Leakage Monitoring Means Therefore" discloses a liner having a porous layer for a high temperature reactor. Hervert et al., however, does not disclose the use of the liner for hydrothermal treatment environments, and consequently, the disclosed liner lacks several very important features necessary for using a liner in hydrothermal treatment. For instance, the liner disclosed by Hervert et al. is not a suitable mechanism for relieving the effects of insoluble salt buildup and reactor plugging, it is not easily replaceable, and there is no thermal barrier.

In light of the above, it is an object of the present invention to provide a liner to protect the pressure bearing wall of a hydrothermal treatment reactor wherein the liner includes a system for leak detection that is operable during the hydrothermal reaction which allows for reactor shutdown before a severe attack on the pressure bearing wall occurs. Another object of the present invention is to provide a liner to protect the pressure bearing wall of a hydrothermal treatment reactor wherein the liner incorporates a mechanism for pre-heating the reaction chamber before steady state treatment conditions are achieved. Yet another object of the present invention is to provide a liner to protect the pressure bearing wall of a hydrothermal treatment reactor wherein the liner incorporates a mechanism for passing a heat exchange fluid near the reaction chamber to allow heat to be recovered from the reaction. Still another object of the present invention is to provide a liner to protect the pressure bearing wall of a hydrothermal treatment reactor incorporating a mechanism to control the liner temperature and thereby prevent the buildup of insoluble salts on the liner. Yet another object of the present invention is to provide a system and method for accomplishing hydrothermal treatment which is easy to implement, simple to use, and cost effective.

SUMMARY OF THE PREFERRED EMBODIMENTS

In accordance with the present invention, a system for performing hydrothermal treatment at temperatures above approximately three hundred seventy-four degrees Celsius (374° C.) and pressures above about 25 bars, includes a reactor vessel that is formed with a pressure bearing wall which surrounds a reactor chamber. An inlet is provided at one end of the reactor vessel to introduce the feed material into the reactor chamber and an outlet is provided at the other end of the reactor vessel to allow the reaction products to be withdrawn from the reactor chamber.

The surface of the pressure bearing wall that faces the reactor chamber is covered by a liner to protect the wall from exposure to temperature extremes, corrosives and salt deposits. For a cylindrically shaped reactor vessel, the liner is cylindrically shaped having a first end and a second end, and conforms to the inside surface of the reactor vessel. The liner is formed with three layers: a non-porous, corrosion resistant primary layer; a porous layer; and a non-porous, secondary layer. The porous layer is positioned between the primary layer and the secondary layer. The liner is positioned in the reactor vessel with the secondary layer facing the pressure bearing wall of the reactor vessel and the primary layer facing the reactor chamber. Seals are provided at each end of the liner. Each seal extends from the primary layer to the secondary layer to thereby seal the porous layer between the primary layer and the secondary layer. The secondary layer of the liner can be placed directly against the pressure bearing wall of the reactor vessel, or a gap can be left between the liner and the pressure bearing wall of the reactor vessel. When a gap is used, a hole may be provided in the wall of the reactor vessel to allow fluid flow in the gap and, therefore, pressurization of the gap. Additionally, provision can be made for fluid communication between the gap and the reactor chamber. An optional layer of insulation can be selectively interposed between the secondary layer of the liner and the pressure bearing wall of the reactor vessel to insulate the wall of the reactor vessel.

A connector extending through the pressure bearing wall or the closures (ends) of the reactor vessel and through the secondary layer of the liner is provided to allow fluid communication between the porous layer and a pump located outside the reactor vessel. When activated, the pump allows a heat transfer fluid to be pumped into the porous layer for circulation within the porous layer. A similar second connector passing through the wall and secondary layer provides an exit for the heat transfer fluid circulating within the porous layer. The discharged heat transfer fluid that flows out of the second connector can be piped back to the pump for recirculation or to a storage reservoir.

In addition to the connectors used for pumping the heat transfer fluid, one of the heat transfer fluid connectors, or another connector may be provided in the wall of the reactor vessel to allow for sampling of the fluid within the porous layer. Specifically, the purpose of this sampling is to determine whether a leak has developed in the corrosive layer of the liner. To do this, the physical or chemical properties of a sample may be measured by a sensor. Physical and chemical properties that may be useful for this purpose include: fluid pressure; fluid flow; fluid temperature; and detection of the presence of a particular chemical species in the fluid. For the present invention, the leak detection connector can function in at least two different ways. In one configuration, a sensor can be positioned within the porous layer allowing the connector to function as a conduit to relay a signal from the sensor to a recorder/display. Alternatively, the connector can function as a fluid passageway allowing the fluid from the porous layer to flow through the connector to an externally located sensor. In either case, the connectors allow for leak detection measurements to be performed during the hydrothermal treatment of the reactants thereby ensuring the continuous integrity of the corrosion resistant layer of the liner.

For the present invention, partitions can be positioned within the porous layer, with each partition extending from the corrosion resistant layer to the pressure bearing wall. Thus, the partitions divide the porous layer into sections and isolate the sections from each other. If partitions are used, separate connectors can be provided for each section to thereby allow each section to be independently heated, cooled and monitored for leaks.

In one embodiment of the present invention, the porous layer is used during installation of the liner in the reactor vessel. Specifically, a cold fluid is passed through the porous layer of the liner to cool and therefore contract the liner prior to insertion of the liner in the reactor chamber. In this manner, a liner can be constructed having an initial outside diameter that is slightly greater than the inside diameter of the reactor vessel. When constructed and installed in this manner, a liner having a tight fit with the reactor vessel can be obtained. To remove the liner from the reactor vessel, a cold fluid can again be passed through the porous layer of the liner to re-contract the liner.

In operation, a warming fluid can be selectively passed through the porous layer of the liner to pre-heat the reactor chamber during periods preceding steady state treatment conditions. Additionally, a coolant can be selectively passed through the porous layer of the liner during the hydrothermal treatment of the reactants to cool the corrosion resistant layer of the liner and to maintain the pressure bearing wall at low service temperatures. By maintaining the temperature of the corrosion resistant layer of the liner at sub-critical temperatures, corrosion rates can be reduced and the accumulation of inorganic solids on the liner can be prevented. Also in accordance with the present invention, the connectors can be utilized in performing leak detection measurements during the hydrothermal treatment of the reactants to ensure the continuous integrity of the corrosion resistant layer of the liner.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
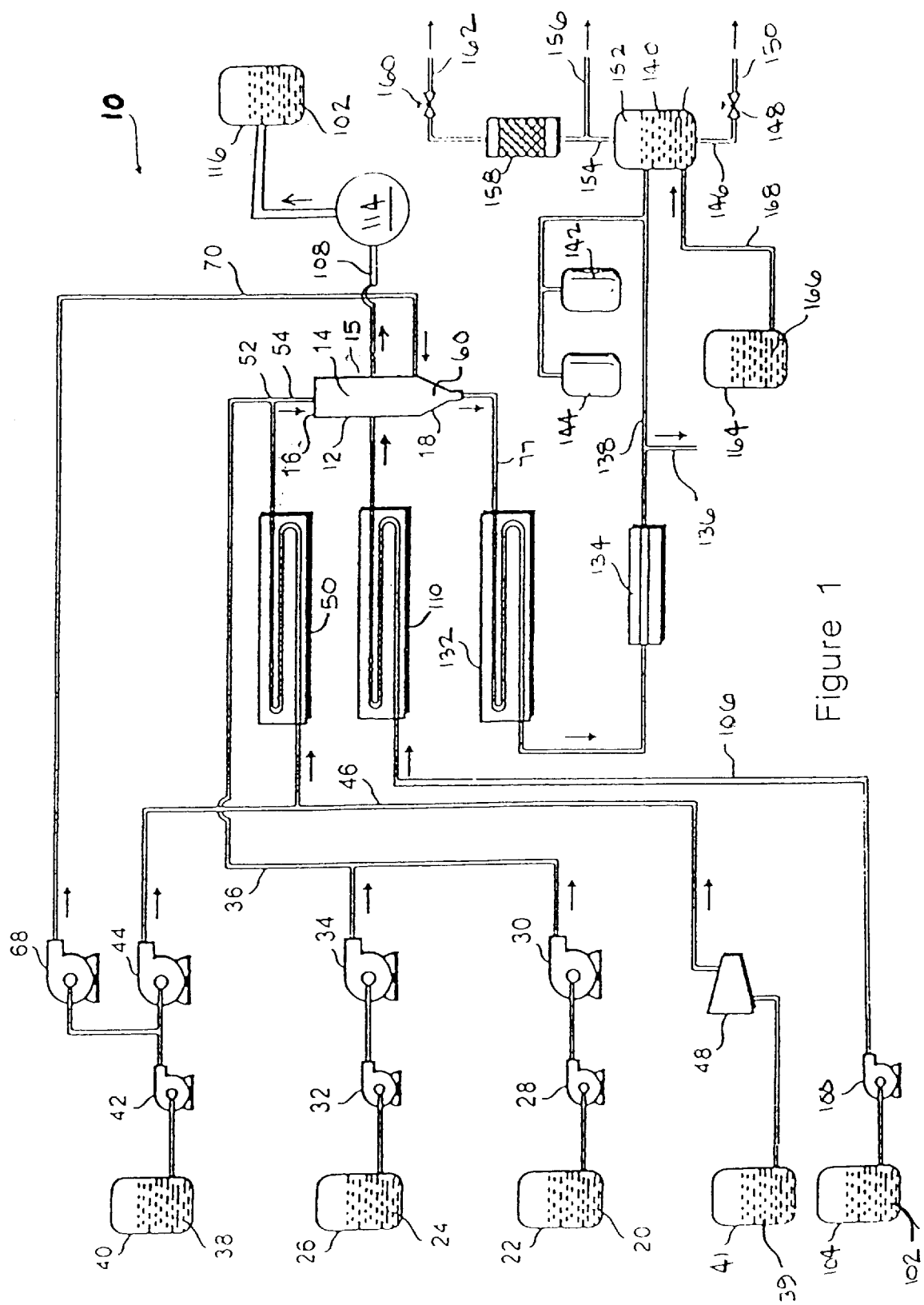
FIG. 1 is a schematic diagram of the components of a system for hydrothermal treatment in accordance with the present invention.

Referring initially to FIG. 1, a hydrothermal treatment system in accordance with the present invention is shown schematically and is generally designated 10. As shown, the system 10 includes a reactor vessel 12 formed with a pressure bearing wall 15 that surrounds a reactor chamber 14. It is also shown that the reactor vessel 12 has an end 16 and an end 18. It is to be appreciated that the vessel 12 can be oriented vertically, horizontally or at an orientation somewhere therebetween.

The feed material to reactor vessel 12 of the system 10 can, in certain embodiments, include several separate identifiable constituents. These are: (i) the reactant to be processed; (ii) an auxiliary fuel, if necessary to sustain reaction in the reactor chamber 14; (iii) water; and (iv) oxidizer(s). More specifically, FIG. 1 shows that the reactant 20 which is to be processed is initially held in a holding tank 22. As contemplated for the present invention, the reactant 20 can consist of organic material, inorganics, sludge, soil, neutralizing agents, salt-forming agents, minerals, and/or combustible material. Further, particulates capable of entering and exiting the reactor vessel 12 can be added to the reactant 20 to remove salt from the reactor vessel 12. These particulates can be inert materials such as sand, silica, soil, titanium dioxide, clay, metal, or ceramic. Also, catalyzing materials such as zeolites, heavy metal oxides or noble metals may be used. In either case, the particulates can be added to the reactor vessel 12 to thereby allow insoluble salts to adhere to the surface of the particulate. The coated particulate may then be removed from the reactor vessel 12. As indicated in FIG. 1, it may be necessary to combine this reactant 20 with an auxiliary fuel 24, such as ethanol, which can be initially held in a holding tank 26.

FIG. 1 shows that both the reactant 20 and the auxiliary fuel 24, if used, are pressurized before being introduced into the reactor chamber 14. Specifically, a transfer pump 28 and high pressure pump 30 are used to pressurize the reactant 20. Similarly, a transfer pump 32 and a high pressure pump 34 are used to pressurize the auxiliary fuel 24. As shown in the schematic of system 10 in FIG. 1, the pressurized reactant 20 and auxiliary fuel 24 are combined in line 36 and transferred to the end 16 of the reactor vessel 12. It is to be noted that while the reactant 20 and auxiliary fuel 24 are respectively pressurized by high pressure pumps 30 and 34 to pressures above about 25 bar, they are not necessarily raised in temperature prior to being introduced into the reactor chamber 14. Thus, as intended for the system 10, the reactant 20 can be introduced into the reactor chamber 14 at ambient temperatures.

In addition to the reactant 20 and auxiliary fuel 24, the feed material to reactor chamber 14 can also include pressurized water 38 and a pressurized oxidizer 39. Specifically, water 38 is drawn from holding tank 40 by transfer pump 42 and is thereafter pressurized by high pressure pump 44 before it is passed into line 46. At the same time, oxidizer 39, is drawn from holding tank 41 and pressurized by a compressor 48 and is passed into the line 46. For purposes of the present invention, the oxidizer 39 to be used, as an alternative to air, can be pure liquid or gaseous oxygen, enriched air, hydrogen peroxide, nitric acid, nitrous acid, nitrate, and nitrite. Alternatively, a substoichiometric amount of oxidizer 39 can be used for applications in which partial oxidation of the reactant 20 is desired. In any event, at this point the pressurized water 38 and compressed air (oxidizer 39) are mixed and introduced into a preheater 50. As contemplated by the present invention, the heating of the pressurized water/air mixture in preheater 50 can be accomplished in several ways. For example, this preheat may be accomplished by a regenerative heat exchange with a hot reaction stream from reactor chamber 14. The preheat can also be accomplished by an external source, such as electricity, or a fired heater, or a combination of these. External heat sources must be used for preheater 50 when a cold startup of the system 10 is required. On the other hand, it should also be noted that for reactant 20 which has sufficient inherent heating value by itself, the preheater 50 may be shut down once a steady state operation of the system 10 has been achieved.

As the air/water mixture leaves the preheater 50, it is mixed with the reactant 20 and auxiliary fuel 24 from the line 36. This mixing occurs at the junction 52, and the feed material, including the combination of reactant 20, auxiliary fuel 24, water 38, and compressed air (oxidizer 39) is then introduced into the reactor chamber 14 via a duct 54. As will be appreciated by the skilled artisan, an alternative for the system 10 is to use separate ducts for introducing one or more of the streams which make up the feed material into the reactor chamber 14. If so, one duct could be used for the introduction of the reactant 20 and auxiliary fuel 24, and another duct would be used for the introduction of water 38 and an oxidizer 39. Similarly, a separate duct could be used for the reactant 20, the auxiliary fuel 24, the water 38, and the oxidizer 39. Further, depending upon the particular reactant 20, it may be important to use a high shear mixer (not shown) at the junction 52 to mix the feed/fuel stream from line 36 with the water/oxidizer stream from the preheater 50. For example, if the reactant 20 is largely water insoluble, high shear mixing is desirable to ensure sufficient mixing of combustible materials and high pressure oxidizer 39.

Figure 2:
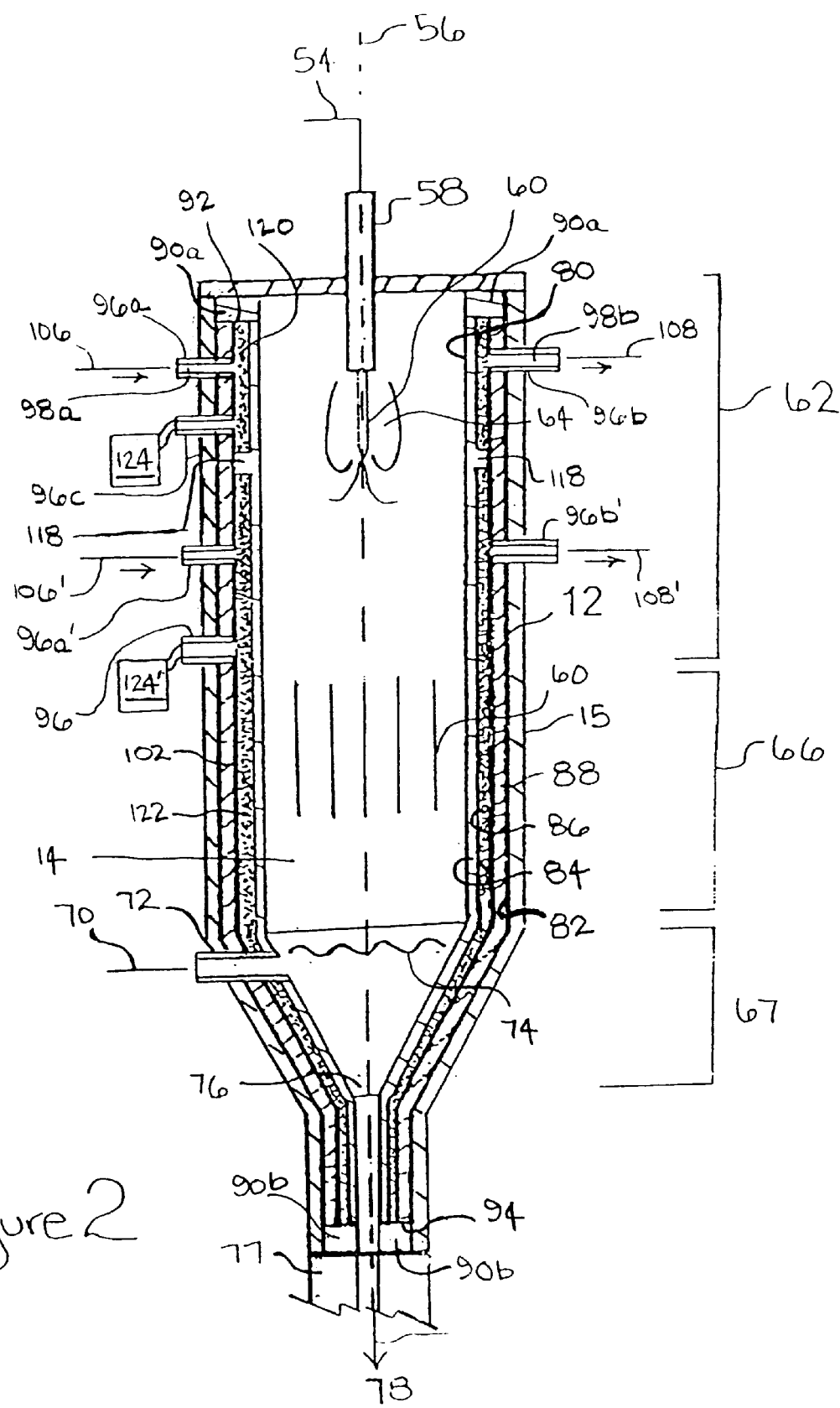
FIG. 2 is a schematic cross-sectional representation of a downflow reactor including a three layer liner in accordance with the present invention.

Referring now to FIG. 2, a representative vessel 12 incorporating the features of the present invention is shown. Specifically, the vessel 12 shown in FIG. 2 is representative of a downflow reactor as disclosed in U.S. Pat. No. 6,054,057 entitled "Downflow Hydrothermal Treatment" which issued to Hazlebeck and is assigned to the same assignee as the present invention. It is to be appreciated that other reactor vessel configurations known in the pertinent art, such as a reversible reactor, can be used with the present invention. As shown in FIG. 2, the vessel 12 generally defines a longitudinal axis 56 and is formed with a wall 15. For the case of a downflow vessel, the longitudinal axis 56 of vessel 12 is vertically oriented with the end 16 directly above the end 18. With this orientation, all of the material that is to be introduced into the reactor chamber 14 through the duct 54 is passed through a nozzle 58. For the exemplary downflow vessel, the nozzle 58 introduces a stream of material 60 into the reactor chamber 14 of the vessel 12 in a direction which is substantially along the axis 56. The nozzle 58 can introduce a straight single jet of the stream 60 or the nozzle 58 can consist of a plurality of nozzles 58 with their respective streams 60 introduced as jets which are inclined toward the axis 56. With this inclination, the streams 60 are directed slightly toward each other for collision with each other.

For the representative downflow reactor vessel, the reaction stream 60 is introduced into the upper portion of the reactor chamber 14 where it is subjected to vigorous back-mixing. Specifically, fluid flow in this back-mixing section 62 is characterized by a turbulence in the reaction stream 60 that results from entraining shear forces and eddies 64 which are set up as the feed material enters into the reactor chamber 14. The feed material is thus rapidly brought above the supercritical temperature of three hundred seventy-four degrees Celsius (374° C.) and rapid reaction commences.

For the representative downflow vessel 12 shown in FIG. 2, a plug flow section 66 is located below a back-mixing section 62 in reactor chamber 14. This plug flow section 66 is characterized by the fact that there is no large scale back-mixing of the reaction stream 60 in this lower portion of the reactor chamber 14. The flow of the reaction stream 60 in the plug flow section 66, however, does exhibit local turbulent mixing. In certain applications, it may be advantageous to provide a filtering device (not shown) below the plug flow section 66. Such a device is useful for trapping low levels of sticky solids or for retaining particulates within the reactor until they have been completely reacted.

The representative downflow vessel 12 can also include a quenching section 67 as shown in FIG. 2 to cool the effluent stream. It may be desirable to quench the effluent stream for a number of reasons, including to re-dissolve any solids that may have developed during the reaction and/or to adjust the pH of the effluent stream. Returning to FIG. 1, for the moment, it can be seen that a high pressure pump 68 is positioned to take water 38 from holding tank 40 and pass it along via line 70 to an input duct 72 (See FIG. 2) near the end 18 of the reactor chamber 14. The water 38 injected through duct 72 is used for quenching the reaction stream 60 in the quenching section 67. Specifically, the quenching fluid that is introduced through duct 72 mixes with the reaction stream 60 and re-dissolves any sticky solids which developed during reaction in the reactor chamber 14. This quenching occurs below the quench fluid level 74, but above the exit port 76, so that the reaction stream 60 can pass through exit port 76 and into the line 77 without causing plugging or fouling of the exit port 76.

It will be appreciated by the skilled artisan that fluids such as high pressure gas, rather than water, can be used as a quenching medium. Also, it will be appreciated that water from an external source, or relatively dirty water (e.g., sea water), or cool, recycled reaction stream 60 can be used as a quenching medium. These options would help to reduce the amount of clean quench water needed by the system 10. Additionally, it should be appreciated that the quenching fluid be maintained at temperatures low enough to allow salts to dissolve in the quenching fluid.

Importantly for the present invention, as seen in FIG. 2, a liner 80 is disposed within the reactor chamber 14, covering a portion of the inner surface 82 of the vessel 12. As shown, the liner 80 includes a non-porous, corrosion resistant primary layer 84, a porous layer 86 and a non-porous secondary layer 88. For the present invention, the porous layer is positioned between the primary layer 84 and the secondary layer 88. The liner 80 is positioned in the reactor chamber 14 with the secondary layer 88 facing the inner surface 82 of the wall 15 of the reactor vessel 12. In this configuration, the primary layer 84 of the liner 80 faces the reactor chamber 14 and is positioned for contact with the reactants 20 in the reactor chamber 14. For purposes of the present invention, the primary layer 84 can be made from suitable corrosion resistant materials known in the pertinent art including titanium, platinum, iridium, titania, and zirconia. The primary layer 84 is preferably solid or of a suitable construction to prevent fluid from passing from the reactor chamber 14 through the primary layer 84 and reaching the porous layer 86. As shown in FIG. 2, the liner 80 is shaped to conform with the inner surface 84 of the reactor vessel 12. In one embodiment of the present invention, the secondary layer 88 of the liner 80 can be placed directly against the inner surface 82 of the wall 15.

FIG. 2 further shows that the liner 80 is formed with ends 92, 94. As shown, a seal 90a is located at the end 92 of the porous layer 86. The seal 90a is provided to attach the primary layer 84 to the secondary layer 88. Similarly, a seal 90b is located at the end 94 of the porous layer 86. As shown, the seal 90b attaches the primary layer 84 to the secondary layer 88. Together, seals 90a, 90b attach the primary layer 84 to the secondary layer 88 to encapsulate the porous layer 86 between the primary layer 84 and the secondary layer 88.

For the present invention, the porous layer 86 can be a powder such as a metallic powder (sintered or unsintered), a metal or other suitable material having machined pores, a porous ceramic (sintered or unsintered), an expanded metal or metallic foam, or any other material known in the pertinent art that is sufficiently porous to allow fluid to flow through the porous layer 86. Further, for purposes of the present invention, the porosity of the porous layer 86 can be substantially uniform or a porosity gradient may be established in the porous layer 86 to selectively channel fluid flow. In the preferred embodiment of the present invention, the porous layer 86 does not need to be pressurized, and consequently, the liner 80 is capable of transmitting the pressure generated in the reactor chamber 14 from the reactor chamber 14 to the walls 15 of the vessel 12. Alternatively, the porous layer 86 can be pressurized during operation to levels that are equal or greater than the pressures experienced in the reactor chamber 14, thereby allowing the use of liner materials that would be otherwise incapable of transmitting the pressure from the reactor chamber 14 to the wall 15 of the reactor vessel 12 without collapsing.

As will be appreciated from the detailed discussion below, in accordance with the present invention, the porous layer 86 can be used to perform several functions including: detecting leaks in the primary layer 84; cooling the primary layer 84 to prevent the accumulation of insoluble salts on the liner 80; lowering the service temperature of the wall 15 of the vessel 12; withdrawing heat from the reactor chamber 14 for heat recovery; and contracting the liner 80 during installation and removal of the liner 80 from the vessel 12. To accomplish these functions, connectors 96 are provided that allow a passageway 98 to the porous layer 86 from outside the vessel 12. Preferably, each connector 96 extends through the wall 15 of the vessel 12 and through the secondary layer 88 of the liner 80.

With combined reference to FIGS. 1 and 2, it can be seen that a pump 100 can be placed in fluid communication with the porous layer 86 to thereby allow a heat transfer fluid 102 to be pumped into and through the porous layer 86. Specifically, as shown, a heat transfer fluid 102 can be pumped from reservoir 104 through line 106 to a connector 96. For use in the present invention, the heat transfer fluid 102 can be water, ethylene glycol, propylene glycol, an inert gas or any other fluid suitable for use as a heat transfer fluid at the temperatures contemplated and described above.

Referring now to FIG. 2, it can be seen that the heat transfer fluid 102 is pumped from line 106 through connector 96a via passageway 98a and into porous layer 86. After circulation within porous layer 86, heat transfer fluid 102 exits the porous layer 86 through connector 96b via passageway 98b and flows into line 108. As described below, a heat transfer fluid 102 can be pumped through the porous layer 86 for several purposes. For example, a heat transfer fluid 102 can be pumped though the porous layer 86 to pre-heat the reactor chamber 14. Referring now to FIG. 1, a preheater 110 is shown positioned along line 106 to preheat heat transfer fluid 102 prior to entering the porous layer 86. Specifically, the reactor chamber 14 can be preheated during periods preceding steady state reactor conditions. As discussed above, combustion of the reactants 20 in the reactor chamber 14 produces heat, and this heat can be used to obtain and maintain the temperatures and pressures required for the hydrothermal treatment. Once the desired temperature and pressure within the reactor chamber 14 is obtained, the feed rates of the reactants 20, auxiliary fuel 24, water 38 and oxidizer 39 can be adjusted to maintain steady state reactor temperatures and pressures. Prior to obtaining the steady state reactor temperature, the chamber 14 can be preheated by passing a preheated heat transfer fluid through the porous layer 86. It is to be appreciated that for applications that do not require a preheated heat transfer fluid 102, the preheater 110 can be bypassed or turned off.

During hydrothermal treatment, a heat transfer fluid 102 can be passed through the porous layer 86 to cool the primary layer 84 of the liner 80 and a thin layer of fluid in the reactor chamber 14 that is immediately adjacent to the liner 80. It is known that below certain temperatures (solubility inversion temperature), inorganic salts become highly soluble in water. As explained above, during normal hydrothermal treatment conditions, most inorganic salts are insoluble due to the high temperatures and pressures in the reactor chamber 14. In the absence of specific precautions, these inorganic salts are free to deposit and accumulate on exposed surfaces, often plugging the reactor vessel. By maintaining the temperature of the primary layer 84 and a thin layer of fluid in the reactor chamber 14 that is immediately adjacent to the liner 80 below the solubility inversion temperature, solids near the primary layer 84 are forced to dissolve rather than deposit on the surface of the primary layer 84. Also explained above, corrosion rates generally increase with increasing temperature. Consequently, reducing the temperature of the primary layer 84 can effectively decrease the rate of corrosion when liner 80 is exposed to corrosives in the reaction stream 60.

Also in accordance with the present invention, during hydrothermal treatment, a heat transfer fluid 102 can be passed through the porous layer 86 to cool the pressure bearing wall 15 of the reactor vessel 12. It is to be appreciated that by lowering the service temperature of the pressure bearing wall 15, thinner wall sections and/or less exotic materials can be used in constructing the vessel 12.

Figure 3:
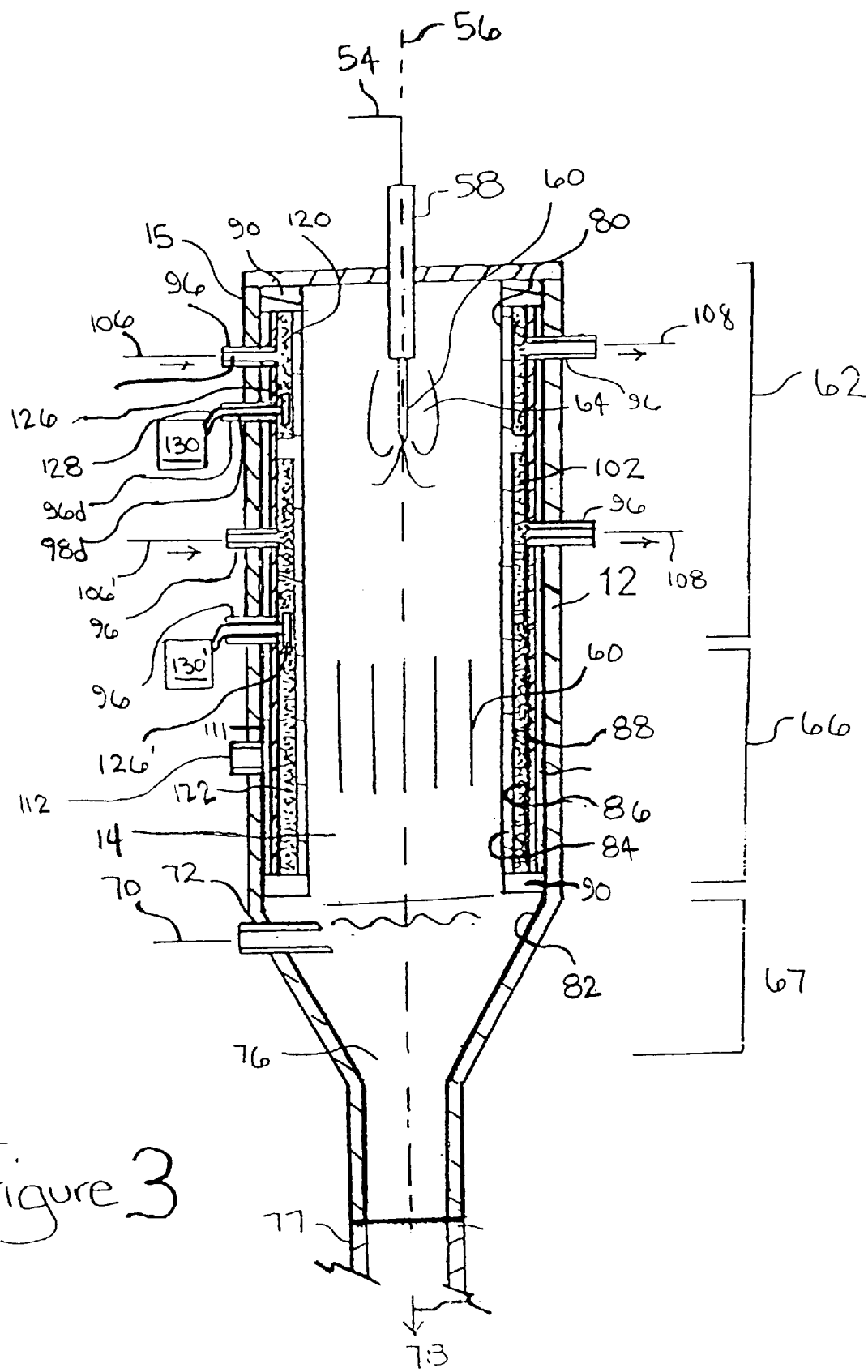
FIG. 3 is a schematic cross-sectional representation for an embodiment of the present invention wherein a three layer liner is positioned in the chamber of a downflow reactor vessel to establish a gap between the reactor vessel wall and the liner.

In an alternative embodiment shown in FIG. 3, the liner 80 can be positioned in the reactor chamber 14 to establish a gap 111 between the secondary layer 88 of the liner 80 and the wall 15. In this embodiment, the seals 90 extend from the primary layer 84 to the wall 15 of the reactor vessel to thereby form a barrier between the reactor chamber 14 and the gap 111. Also in the embodiment shown in FIG. 3, an opening 112 through wall 15 can be provided to allow for pressurization of the gap 111. In this embodiment, a heat transfer fluid 102 can be passed through the porous layer 86 to cool the primary layer 84, to preheat the reactor chamber 14, or as discussed below, to recover heat generated during hydrothermal treatment.

Figure 4:
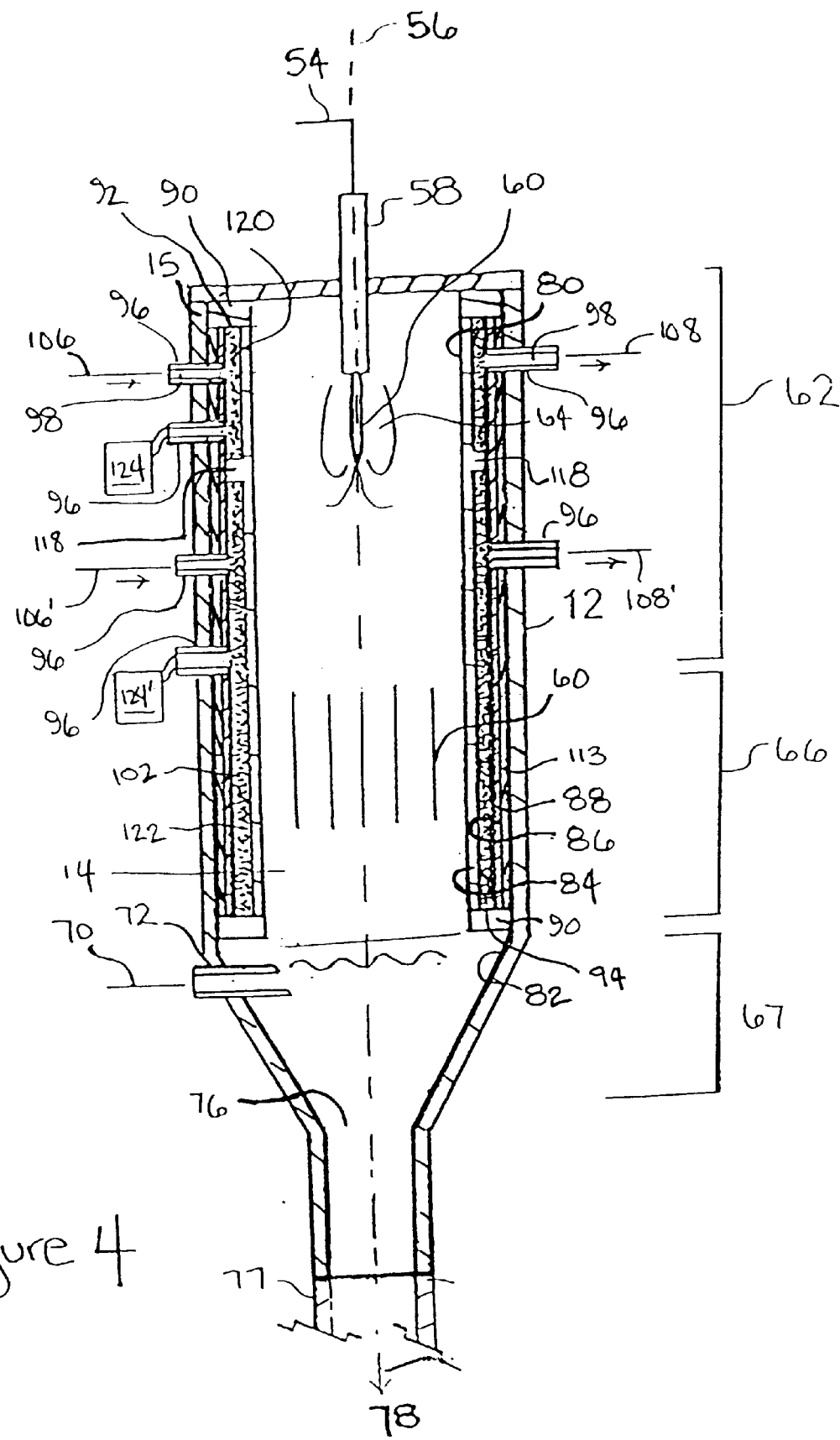
FIG. 4 is a schematic cross-sectional representation for an embodiment of the present invention having layer of insulation positioned between the reactor vessel wall and the three layer liner.

In another embodiment shown in FIG. 4, a layer of insulation 113 can be positioned between the secondary layer 88 of the liner 80 and the wall 15 to lower the service temperature of the pressure bearing wall 15. In the embodiment of the present invention shown in FIG. 4, a heat transfer fluid 102 can be passed through the porous layer 86 to cool the primary layer 84, to preheat the reactor chamber 14, or as discussed below, to recover heat generated during hydrothermal treatment.

With combined reference to FIGS. 1 and 2, it will be seen that a heat transfer fluid 102 can also be pumped through the porous layer 86 to recover heat generated during hydrothermal treatment. As shown in FIG. 1, heat transfer fluid 102 exiting the vessel 12 through line 108 can be sent to a heat exchanger 114 for heat recovery and then routed to a reservoir 116.

Referring now to FIG. 2, a partition 118 can be used to divide the porous layer into sections 120, 122, isolating section 120 from section 122. Although only one partition 118 is shown in FIG. 2, it is to be appreciated that more that one partition 118 may be used in accordance with the present invention. As shown in FIG. 2, separate connectors 96 can be provided for each section 120, 122, allowing for independent pumping of heat transfer fluid 102 through each section 120, 122. Specifically, as shown, heat transfer fluid 102 can be pumped from line 106 into section 120 of porous layer 86, entering through connector 96a' and exiting through connector 96b. Similarly, heat transfer fluid 102 can be pumped from line 106' into section 122 of porous layer 86, entering through connector 96a' and exiting through connector 96b'. Although the additional line 106' is not shown in FIG. 1, it is to be appreciated that an additional line, pump and reservoir can be provided to accommodate each additional section 120, 122.

Also in accordance with the present invention, as shown in FIG. 2, each section 120, 122 of the porous layer 86 can be monitored to ensure that the high pressure reaction stream 60 is not leaking through the primary layer 84 of the liner 80. Specifically, connectors 96, such as connector 96c shown in FIG. 2, can be provided that extend through the pressure bearing wall 15 of the vessel 12 allowing access to the porous layer 86 for monitoring. Although not shown in the Figures, it is to be appreciated that a single connector 96 could function both as a passageway 98 for pumping a heat transfer fluid 102 into the porous layer 86 and to provide access for leak detection. In one embodiment of the present invention, an external sensor 124 can be positioned outside the vessel 12 as shown in FIG. 2. Fluid communication between the external sensor 124 and section 120 of the porous layer 86 is provided by the connector 96c. Specifically, fluid from section 120 is allowed to flow through the passageway 98c to the external sensor 124 and preferably, back to the porous layer 86. For the present invention, the external sensor 124 can be a device capable of measuring flow rate, pressure, pH, temperature, the presence of any chemical species known to be in the reactor chamber 14, or any other property known in the pertinent art which will indicate that a leak has developed in the primary layer 84 of the liner 80. It is to be appreciated that each section 120, 122 can be monitored by a separate external sensor 124 (for example, FIG. 2 shows section 122 being monitored by external sensor 124') or each section 120, 122 can be piped together for monitoring by a single external sensor 124.

In another embodiment of the present invention, as shown in FIG. 3, internal sensors 126 can be provided to monitor each section 120, 122 of the porous layer 86 to ensure that the primary layer 84 of the liner 80 is not leaking. In this embodiment, connectors 96, such as connector 96d shown in FIG. 3, can be provided that extend through the pressure bearing wall 15 of the vessel 12 allowing a signal from the internal sensor 126 to be sent through the passageway 98d over wire(s) 128 to a display/recorder 130 located outside the vessel 12. It is to be appreciated that the signal from the internal sensor 126 could also be sent to a controller having a processor (not shown). For the present invention, the internal sensor 126 can be a device capable of measuring flow rate, pressure, pH, temperature, the presence of any chemical species known to be in the reactor chamber 14, or any other property known in the pertinent art which will indicate that a leak has developed in the primary layer 84 of the liner 80. It is to be appreciated that each section 120, 122 can be monitored by a separate internal sensor 126 (for example, FIG. 3 shows section 122 being monitored by external sensor 126').

Returning now to FIG. 1, it will be seen that as the reaction stream 60 is removed from the vessel 12 it is passed through the line 77 to a cooler 132. As contemplated for system 10, the cooler 132 may use regenerative heat exchange with cool reactor stream, or heat exchange with ambient or pressurized air, or a separate water supply, such as from a steam generator (not shown). Once cooled by the cooler 132, the high pressure reactor stream is then depressurized. Preferably, depressurization is accomplished using a capillary 134. It will be appreciated, however, that a pressure control valve or orifice (not shown) can be used in lieu of, or in addition to, the capillary 134.

After the effluent 78 from the reactor chamber 14 has been both cooled by the cooler 132 and depressurized by capillary 134, it can be sampled through the line 136. Otherwise, the effluent 78 is passed through the line 138 and into the liquid-gas separator 140. To allow accumulation of a representative sample in separator 140, it can be diverted to either tank 142 during startup of the system 10, or to tank 144 during the shutdown of system 10. During normal operation of the system 10, the line 146 and valve 148 can be used to draw off liquid 150 from the collected effluent. Additionally, gas 152 from the headspace of separator 140 can be withdrawn through the line 154 and sampled, if desired, from the line 156. Alternatively, the gas 152 can be passed through the filter 158 and valve 160 for release as a nontoxic gas 162 into the atmosphere. As will be appreciated by the person of ordinary skill in the pertinent art, a supply tank 164 filled with an alkali agent 166 can be used and the agent 166 introduced into the separator 140 via line 168 to counteract any acids that may be present.

While the particular systems and methods for hydrothermal treatment as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A liner for a hydrothermal pressure vessel, said vessel having a wall defining a chamber and said liner comprising:

a non-porous primary layer;

a non-porous secondary layer attached to said primary layer to establish a pocket therebetween;

a porous layer encapsulated inside said pocket between said primary layer and said secondary layer;

at least one connector extending into said chamber and into contact with said porous layer for conveying operational information from said porous layer; and at least one partition positioned in said pocket between said primary layer and said secondary layer for dividing said porous layer into sections and for isolating said sections from each other.

2. A liner as recited in claim 1 further comprising a seal for coupling said primary layer to said wall to position said liner adjacent said wall in said chamber with said secondary layer therebetween.

3. A liner as recited in claim 1 wherein said secondary layer is distanced from said wall of said chamber to establish a gap therebetween.

4. A liner as recited in claim 1 further comprising an insulation layer positioned adjacent said wall of said vessel between said secondary layer and said wall of said vessel.

5. A liner as recited in claim 1 wherein said partition divides said porous layer into a first section and a second section and said liner further comprises:

means in fluid communication with said first section of said porous layer for selectively pumping a heat transfer fluid therethrough; and means in fluid communication with said second section of said porous layer for selectively pumping a heat transfer fluid therethrough.

6. A liner as recited in claim 1 wherein said connector extends through said well of said chamber.

7. A liner as recited in claim 1 further comprising means in fluid communication with said porous layer for pumping a fluid therethrough.

8. A liner as recited in claim 1 further comprising a pressure sensor for determining the pressure in said porous layer.

9. A liner as recited in claim 1 further comprising a chemical species sensor for determining the presence of a chemical species in said porous layer.

10. A liner as recited in claim 1 further comprising a flow sensor for determining the flow in said porous layer.

11. A liner as recited in claim 1 further comprising a sensor for performing leak detection measurements, said sensor embedded in said porous layer for passing a signal through said wall.

* * * * *

UNITED STATES PATENT AND TRADEMARK OFFICE
CERTIFICATE OF CORRECTION

PATENT NO. : 6,576,185 B2
DATED : June 10, 2003
INVENTOR(S) : David A. Hazelbeck It is certified that error appears in the above-identified patent and that said Letters Patent is hereby corrected as shown below:

<u>Column 10,</u>
Line 27, delete "96a'" insert -- 96a --

Signed and Sealed this

Twenty-ninth Day of July, 2003

JAMES E. ROGAN
*Director of the United States Patent and Trademark Office*